US011436104B2

(12) United States Patent
Prasad et al.

(10) Patent No.: US 11,436,104 B2
(45) Date of Patent: Sep. 6, 2022

(54) DECREASING DATA RESTORATION TIMES USING ADVANCED CONFIGURATION AND POWER INTERFACE (ACPI)

(71) Applicant: EMC IP Holding Company LLC, Hopkinton, MA (US)

(72) Inventors: Parmeshwr Prasad, Bangalore (IN); Rahul Vishwakarma, Bangalore (IN); Bing Liu, Tianjin (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 17/084,307

(22) Filed: Oct. 29, 2020

(65) Prior Publication Data

US 2022/0138054 A1 May 5, 2022

(51) Int. Cl.
*G06F 11/14* (2006.01)

(52) U.S. Cl.
CPC ...... *G06F 11/1469* (2013.01); *G06F 11/1453* (2013.01); *G06F 11/1464* (2013.01); *G06F 2201/84* (2013.01)

(58) Field of Classification Search
CPC ............ G06F 11/1469; G06F 11/1464; G06F 2201/84
See application file for complete search history.

(56) References Cited

U.S. PATENT DOCUMENTS

| | | | | |
|---|---|---|---|---|
| 6,970,966 B2 * | 11/2005 | Gemelli | ................. | G06F 30/30 710/305 |
| 7,917,474 B2 * | 3/2011 | Passey | ................ | G06F 16/2246 707/655 |
| 7,921,266 B2 * | 4/2011 | Rangarajan | ......... | G06F 13/4243 711/158 |
| 8,214,400 B2 * | 7/2012 | Fachan | ............... | G06F 16/2246 707/793 |
| 8,296,398 B2 * | 10/2012 | Lacapra | ............. | H04L 67/1097 209/217 |
| 8,429,630 B2 * | 4/2013 | Nickolov | ................ | H04L 69/32 717/148 |
| 8,560,827 B1 * | 10/2013 | Yiftachel | ............. | G06Q 10/067 715/239 |
| 8,688,899 B2 * | 4/2014 | Nellans | ............... | G06F 12/0246 711/103 |

(Continued)

*Primary Examiner* — Merilyn P Nguyen
(74) *Attorney, Agent, or Firm* — Staniford Tomita LLP

(57) ABSTRACT

A set of restore jobs are created to restore a backup. The backup may be maintained across a set of storage devices connected to a backup server. The set of storage devices have different levels of performance and each restore job is responsible for restoring from a respective storage device. Information describing arrangements of processors and memory units is reviewed to create a set of heterogeneous domains, each domain including a processor and memory unit. Performance characteristics, including latency and bandwidth measurements, of the heterogeneous domains are examined. The heterogeneous domains are ranked based on their performance characteristics. The restore jobs are assigned to the heterogeneous domains by successively matching a restore job associated with a storage device having a lowest level of performance relative to other unmatched storage devices with a heterogeneous domain having a highest level of performance relative to other unmatched heterogeneous domains.

12 Claims, 7 Drawing Sheets

(56) References Cited

U.S. PATENT DOCUMENTS

| | | | | |
|---|---|---|---|---|
| 9,465,650 | B2* | 10/2016 | Meng | G06F 9/466 |
| 11,288,138 | B1* | 3/2022 | Freilich | G06F 11/1469 |
| 2005/0278493 | A1* | 12/2005 | Lin | G06F 11/1458 |
| | | | | 714/E11.121 |
| 2008/0002694 | A1* | 1/2008 | Brahmaroutu | G06F 11/1456 |
| | | | | 370/392 |
| 2010/0332456 | A1* | 12/2010 | Prahlad | G06F 16/1748 |
| | | | | 713/160 |
| 2019/0324857 | A1* | 10/2019 | Xu | H04L 67/1095 |
| 2020/0076812 | A1* | 3/2020 | Spurlock | G06F 21/10 |

* cited by examiner

DECREASING DATA RESTORATION TIMES USING ADVANCED CONFIGURATION AND POWER INTERFACE (ACPI)

TECHNICAL FIELD

The present invention relates generally to the field of information management, and, more particularly, to restoration of data stored in a backup storage system.

BACKGROUND

Backup systems play a critical role in the operation of many different business organizations. Having a backup system can help an organization recover from various data loss events. Backup storage systems including backup applications, servers, and storage employ a variety of techniques to address problems associated with storing large amounts of data and accompanying costs. A backup system may include a storage system having any number of different storage devices each having different levels of performance, and thus cost, to reflect the different levels of priority data can have in a backup.

Deduplication also forms a part of many modern backup systems. A deduplication mechanism can reduce the amount of redundant data that is stored. When a unit of data is identified as being a duplicate, a reference linking to the already existing data can be created and the data does not have to be again stored. While much attention has been given to improving the efficiency of backup operations, less attention has been given to restore operations. Indeed, it can sometimes be the case that completing a restore operation takes longer than completing a backup operation. One reason is because of the poor locality of data on the backup storage disks due to the deduplication mechanism. Having to endure long restoration times can be extremely frustrating to a customer of the backup system because of the disruption to normal business operations while the customer waits for the restore operation to complete.

Therefore, there is a need for improved systems and techniques to reduce restore operation times.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
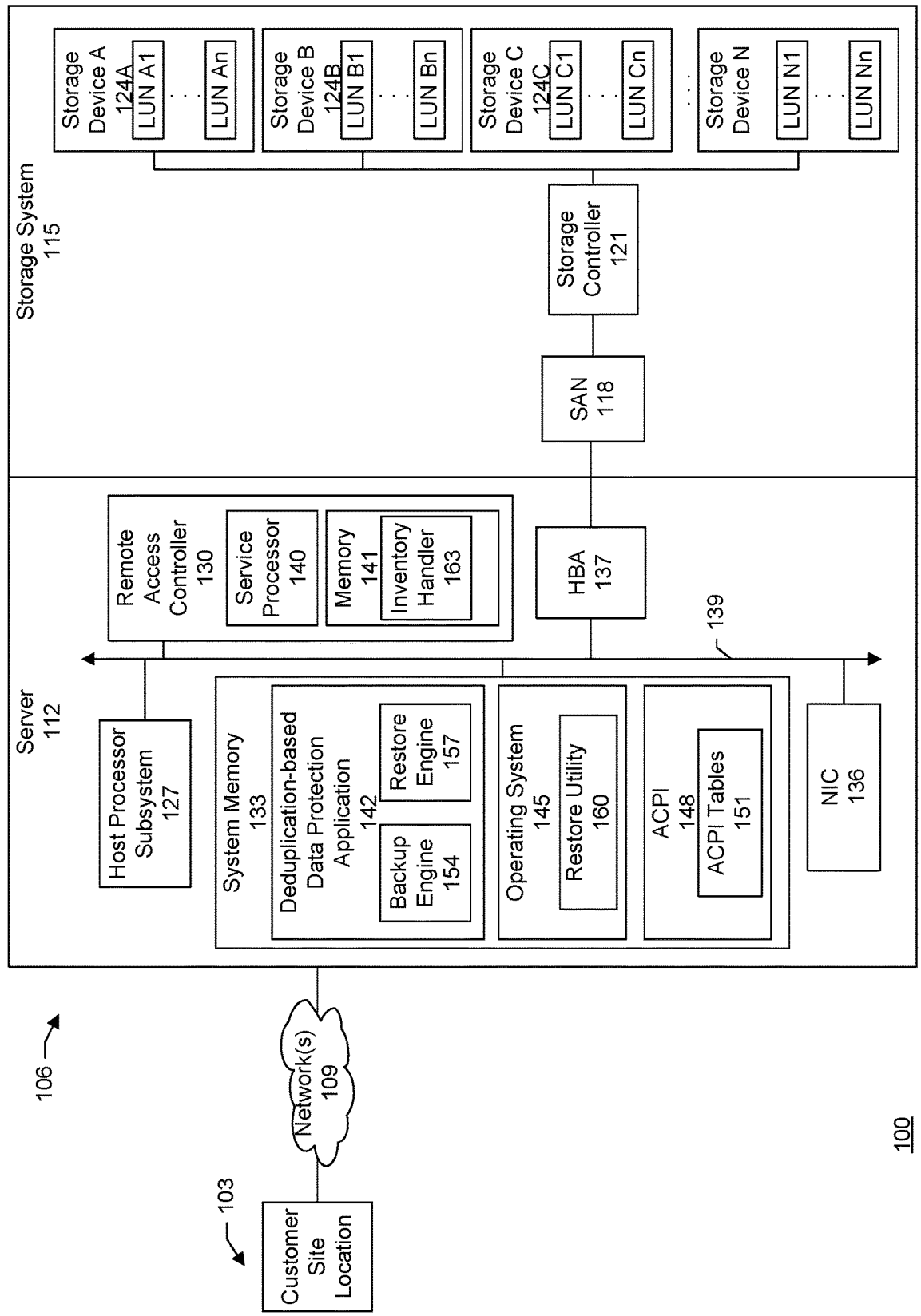
FIG. 1 shows a block diagram of an information handling system that leverages Advanced Configuration and Power Interface (ACPI) to reduce the time to complete a data restoration operation in accordance with one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. The variable N and other similar index variables are assumed to be arbitrary positive integers greater than or equal to two.

FIG. 1 shows a block diagram of a system 100 for reducing an amount of time required to conduct a restore operation by a data protection or backup system. In a specific embodiment, the data protection system is a deduplication-based backup system. A backup is the process of copying data from client hosts to a backup storage system. These copies help protect against data loss. A typical organization can have many hundreds or even many thousands of client hosts backing up data to the storage system on a regular basis. There can be an enormous amount of data to protect.

A deduplication-based backup system can reduce the amount of redundant data that is stored. In a deduplication-based backup system, data such as files to be backed up are divided into a set of segments. The segments are hashed to generate a set of fingerprints. These fingerprints uniquely identify the segments. The backup system maintains metadata separate from the actual data being backed up. In a specific embodiment, the metadata includes a collection of fingerprints corresponding to data segments that already exist on the backup system. If the fingerprint of a data segment from a file to be backed up does not match an existing fingerprint, the data segment is written to the physical disk storage of the backup system and the fingerprint is added to the collection of existing fingerprints. If, however, the fingerprint matches an existing fingerprint, the data segment is determined to be a duplicate and is not written to the backup storage system. Instead, a reference is generated that points to the already existing data segment on backup storage that corresponds to the fingerprint. The reference is stored as metadata by the backup system so that the file can be reconstructed or reassembled as part of a restore operation.

The deduplication storage system includes multiple levels of logical abstractions above the physical disk storage devices in order to facilitate access to the stored data. At the highest level, a namespace exists which allows a user to access data stored on the disk through an external application which may reside on a separate host. A user can access data through a protocol such as virtual tape libraries (VTL), Data Domain BOOST, Common Internet File system (CIFS), and Network File System (NFS). A deduplicating storage system may use any combination of these simultaneously to store and access data.

A next level of abstraction includes a collection of logical objects that, in a specific embodiment, may be referred to as Mtrees. An Mtree is a type of Btree. A Btree is a self-balancing tree data structure that maintains sorted data and allows searches, sequential access, insertions, and deletions in logarithmic time. Mtrees or Btrees facilitate reading large blocks of data such as databases and filesystems.

In a specific embodiment, each Mtree is a mountable filesystem representing part of the filesystem namespace. Mtrees create "virtual volumes" that can be managed independent of the physical storage that they use. Stored within each Mtree is one or more hierarchies of one or more directories (i.e., directories with subdirectories) of each namespace, and stored within each directory or subdirectory are files, e.g., user text files, audio, or video files.

In other words, in a specific embodiment, the Mtree includes a hierarchical arrangement of logical references or links that map to the various segments stored on the actual physical storage devices. A file can be reconstructed by traversing an Mtree for the file to identify the references that map to the actual data segments that makeup the file. Mtree data may be spread across multiple (e.g., two or more) storage devices. A data segment stored on a physical disk storage device may be associated with multiple files, which may be from a same Mtree or from different Mtrees. Restoring backups from a deduplication-based backup system can be especially time-consuming because of the poor locality of data on the backup storage disks due to the deduplication mechanism. Indeed, it can often be the case that the time to complete a backup operation is much less than the time to complete a restore operation. In an embodiment, systems and techniques are provided for accelerating the restore performance in a deduplication-based backup system.

Referring now to FIG. 1, this system includes any number of customer clients 103, an information handling system (IHS) 106, and a network 109 connecting the clients and information handling system. In a specific embodiment, the information handling system is a deduplication-based backup system. An example of a deduplication-based backup system is Data Domain as provided by Dell EMC of Hopkinton, Mass. While some embodiments are described in conjunction with a backup system referred to as Data Domain, it should be appreciated that aspects and principles of the systems and techniques described herein can be applied to other backup or data protection systems provided by other vendors. It should be appreciated that the blocks, components, and modules shown in FIG. 1 may be functional and there can be many different hardware configurations, software configurations, or both to implement the functions described.

The information handling system includes a server 112 connected to a backup storage system 115. The server may be referred to as a backup server. The connection may be via a local area network (LAN) or a storage area network (SAN) 118 as shown in the example of FIG. 1. The backup storage system may include storage servers, clusters of storage servers, network storage device, storage device arrays, storage subsystems including RAID (Redundant Array of Independent Disks) components, a storage area network (SAN), Network-attached Storage (NAS), Direct-attached Storage (DAS), or disk-array enclosure (DAE) that make use of large-scale network accessible storage devices, such as large capacity tape or drive (optical or magnetic) arrays. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or partitioned into multiple LUNs. A LUN may include a portion of a disk, portions of multiple disks, or multiple complete disks. The storage system includes a storage controller 121 connected between the SAN and a set of storage devices.

In the example shown in FIG. 1, there is a first storage device A 124A, second storage device 124B, and third storage device 124C. As discussed, a storage device may include a disk array enclosure. A disk array enclosure is a storage component containing multiple disk drives that may be logically grouped into one or more LUNs. The storage devices offer different levels of performance such as different bandwidths, latencies, reliabilities, write speeds, read speeds, capacities, access time, seek time, and other performance parameters.

Different storage devices may be implemented using different storage media and technologies. Some examples of storage media and technologies include hard disk drives (HDD), solid state drives (SSD), hybrid drives, tape, and others. The storage devices may be organized into different storage tiers to provide a cost-effective storage architecture that balances different application or data priority levels, performance requirements, availability, and scalability. Thus, backups may be spread across a tiered storage system with each tier having different levels of performance corresponding to different priority levels of data that may be included in the backups. For example, a high-priority database in a backup may be backed up to a high-performing storage device of the backup system; other applications or data having lower priority may be backed up to a lower-performing, but less costly, storage device of the backup system.

The server includes a host processor subsystem 127, remote access controller 130, system memory 133, network interface controller (NIC) 136, host bus adaptor (HBA) 137, and other components that may be interconnected via a bus 139 or other interconnection architecture. The network interface controller allows for connecting to a network, e.g., network 109. The host bus adaptor allows for connecting to the storage system.

The host processor subsystem may include one or more processors or central processing units (CPUs). A CPU may be a multi-core processor. A multi-core processor is a single computing component with two or more independent processing cores that are able to read and execute program instructions or software code. These multiple cores can run multiple instructions concurrently, thus increasing the overall processing speed for programs. Multiple cores typically are integrated onto a single integrated circuit die or integrated circuit or onto multiple dies in a single chip package. Each multi-core processor may include one or more "CPU sockets." Each CPU socket may have one or more processor cores, one or more memory controllers which allow for dual in-line memory module(s) (DIMMs) external to a CPU socket, and one or more Peripheral Component Interconnect Express (PCIe) Input/Output (I/O) lanes.

The remote access controller includes a service processor 140 and memory 141. The remote access controller provides an out-of-band management platform for the host server including access to system information and status of components including inventory details about CPU and memory. More particularly, the server operating system is concerned with executing applications; the remote access controller is concerned with monitoring and managing the server's environment and state outside of the operating system. The remote access controller includes a dedicated management channel that allows a system administrator to monitor the host regardless of whether the host is powered on. Traffic to the remote access controller is routed through a private, internal network that is outside of the server's data path and outside of the server operating system's control. The remote access controller can be accessed via its own assigned internet protocol (IP) address using a web interface, telnet, or Secure Shell (SSH) and supported network management protocols such as Intelligent Platform Management Interface (IPMI). An example of a remote access controller is the integrated Dell Remote Access Controller (iDRAC). iDRAC includes as a persistent storage device an embedded multimedia card (eMMC). An embedded multimedia card is a small storage device made up of NAND flash memory and a storage controller. Both the flash memory and controller are contained on a single integrated circuit (IC) that is embedded permanently into a device.

In an embodiment, the system memory includes a deduplication-based data protection or backup application 142 that is executed by the host processor, operating system 145, and Advanced Configuration and Power Interface (ACPI) 148 including ACPI tables 151. The operating system manages the server hardware, software resources, and provides common services for computer programs.

The deduplication-based data protection application includes a backup engine 154 and a restore engine 157. The backup engine is responsible for conducting backups of customer data to the backup storage system. As discussed, a backup may be spread across multiple (e.g., two or more) storage devices.

The restore engine is responsible for conducting restore operations. A restore operation may be split into a set of jobs that "move" the customer's data from the storage system back to the customer. A restore job may run concurrently or in parallel with another restore job. In a specific embodiment, systems and techniques are provided to intelligently match resources available at the server to various restore jobs of a restore operation in order to decrease the overall time required to complete the restore operation. Restore jobs rely on IO between the storage system and the server. The IO includes the loading or moving of data from the storage system to the server for processing. In a specific embodiment, the restore engine coordinates with a restore utility 160 of the OS and inventory handler 163 of the remote access controller to communicate with ACPI and collect information about hardware resources or components (e.g., processor and memory), create virtual or heterogeneous domains based on the information, gather performance metrics or characteristics associated with the domains, rank the domains, and intelligently assign the restore jobs to the domains.

The ACPI specification provides an open standard that operating systems can use to discover and configure computer hardware components. ACPI can be used for device discovery, operating system-directed configuration and power management (OSPM), thermal management and RAS (reliability, availability and supportability) features. The ACPI specification is provided by the Unified Extensible Firmware Interface (UEFI) Forum and is incorporated by reference along with all other references cited.

ACPI includes tables that describe the architecture of the information handling system. The operating system can use the tables to allocate resources efficiently. The ACPI tables describe system information, features, and methods for controlling those features. These tables include a system resource affinity table (SRAT) and heterogeneous memory attribute table (HMAT). A table can be a static data structure that is passed to the operating system upon boot.

The SRAT table stores topology information for all the processors and memory, and more specifically, describes the physical locations of the processors and memory in the system. The SRAT table includes a memory affinity structure and associates each processor and blocks of memory (e.g., memory ranges) to an integer referred to as a proximity domain. The SRAT table include entries that describe the affinity between a processor and the various memory units in the system. A review of the SRAT table can determine proximity or distances between the processors and memory units.

Figure 2:
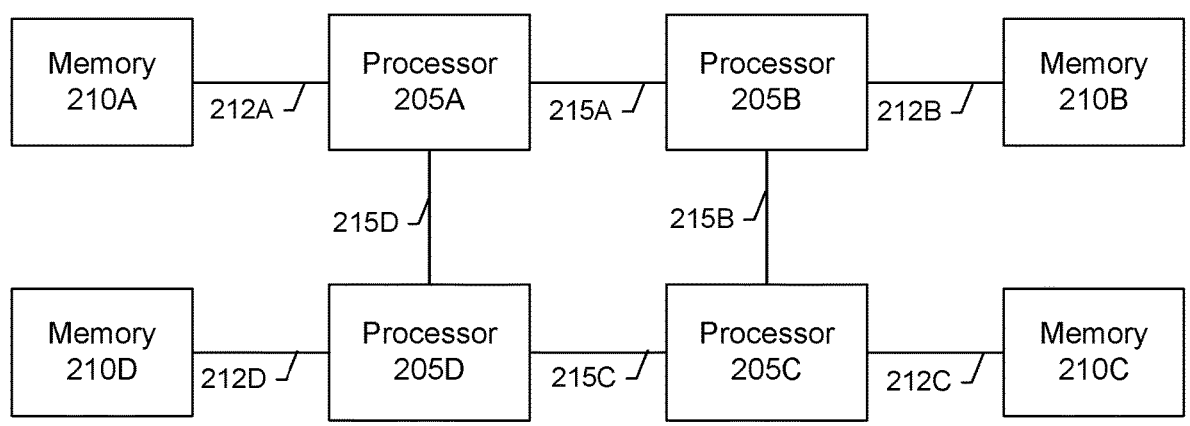
FIG. 2 shows a block diagram illustrating an arrangement of processors and memory that may be found in the information handling system in accordance with one or more embodiments.

At any given time, the server may be receiving and processing incoming network traffic, and executing any number of different programs, processes, and tasks. In a specific embodiment, information describing arrangements of processors and memory units is reviewed to create a set of heterogeneous domains. FIG. 2 shows a block diagram of an example illustrating an arrangement of processors 205A-D and memory units 210A-D that may be found in the information handling system (e.g., server). Each processor is associated with a memory unit and connects to its respective memory unit via I/O bridges 212A-D. The processors are connected via buses or UPI links 215A-D.

A processor is able to access its local memory quicker than it can access non-local or remote memory because the local memory is nearer or in closer proximity to the processor than the non-local or remote memory (e.g., memory local to another processor). Consider, as an example, that processor 205A is running a program but is using memory 210B, 210D, or even memory 210C. Memory 210B, 210D, and 210C especially are further away from processor 205A as compared to memory 210A. Thus, it may be more efficient to use memory 210A which is local to processor 205A because memory 210B, 210D, and 210C may require longer access times than memory 210A. In a specific embodiment, the heterogeneous domains may be created such that each heterogeneous domain includes a processor and a memory unit where the memory unit is local or close to the processor. For example, the SRAT table may be reviewed to determine proximity between a set of processors and a set of memory units. Heterogeneous domains may be created based on the review such that a heterogeneous domain includes a processor and a memory unit where the memory unit is closer to the processor as compared to other memory units outside the heterogeneous domain.

The SRAT table, however, does not store metrics (e.g., latency and bandwidth) between system components. Instead, the HMAT table describes the memory attributes, such as memory side cache attributes and bandwidth and latency details, related to the proximity domains. In particular, the HMAT table provides performance information, including expected latency and bandwidth, for various memory initiator, memory target pairs. A memory initiator can be a component that initiates a memory request. A memory request can be from a CPU, separate memory I/O device, process, or other non-CPU initiator. A memory target can be a CPU-accessible physical address range.

In a specific embodiment, performance characteristics or metrics of the heterogeneous domains are reviewed and the heterogeneous domains are ranked according to their performance characteristics. Such performance characteristics may include latency and bandwidth measurements, metrics, or values. An algorithm of the restore engine successively matches a restore job associated with a storage device having a lowest level of performance relative to other unmatched storage devices with a heterogeneous domain having a highest level of performance relative to other unmatched heterogeneous domains. Different storage technologies may be mixed with the heterogeneous domains. Different network traffic, e.g., incoming network traffic may be mixed with the heterogeneous domains. In short, slower storage and network traffic may be assigned to higher performing heterogeneous domains; while faster storage and network traffic may be assigned to lower performing heterogeneous domains. The intelligent matching or pairing helps to accelerate the overall restore performance.

Applicant has recognized the following with respect to a restore operation.

1) Data read rate should depend on data processed capacity of the system. If the system latency increases data has to move to a better place for processing.

2) In some backup systems, the read path is slower than the write path. Creating multiple read JOBs is not helping to improve read performance. Restore job loads are automatically distributed on multiple ports, and there is no segregation of job with customer data priority.

3) A compression restore involves first compressing the data and sending it to the client. In this process compression resources are shared. If compression accompanies a restore operation, then efficiency of compression plays an important role on restore. Compression logic is unaware of hardware heterogeneousness.

4) Some backup systems include an aggressive read-ahead logic, such as automatic multi-streaming (AMS) managed file replication (MFR). A single MFR job may be broken in multiple streams. These streams must be aware of system topology and dynamic changing attributes to improve further performance.

4) Some backup systems provide a read-ahead that mainly reads in a random fashion and the application jumps around while reading the file which is not providing for a significant performance improvement.

In a specific embodiment, systems and techniques are provided for accelerating the restore performance in a deduplication-based backup system based on ACPI assisted operations by:

1) Matching memory initiator (restore job) and memory target (heterogeneous domain) path with best available memory bandwidth.

2) Ranking the heterogeneous domain based on access, read bandwidth and read cache attribute of memory; and altering allocating a restore job to these virtual domains.

Figure 3:
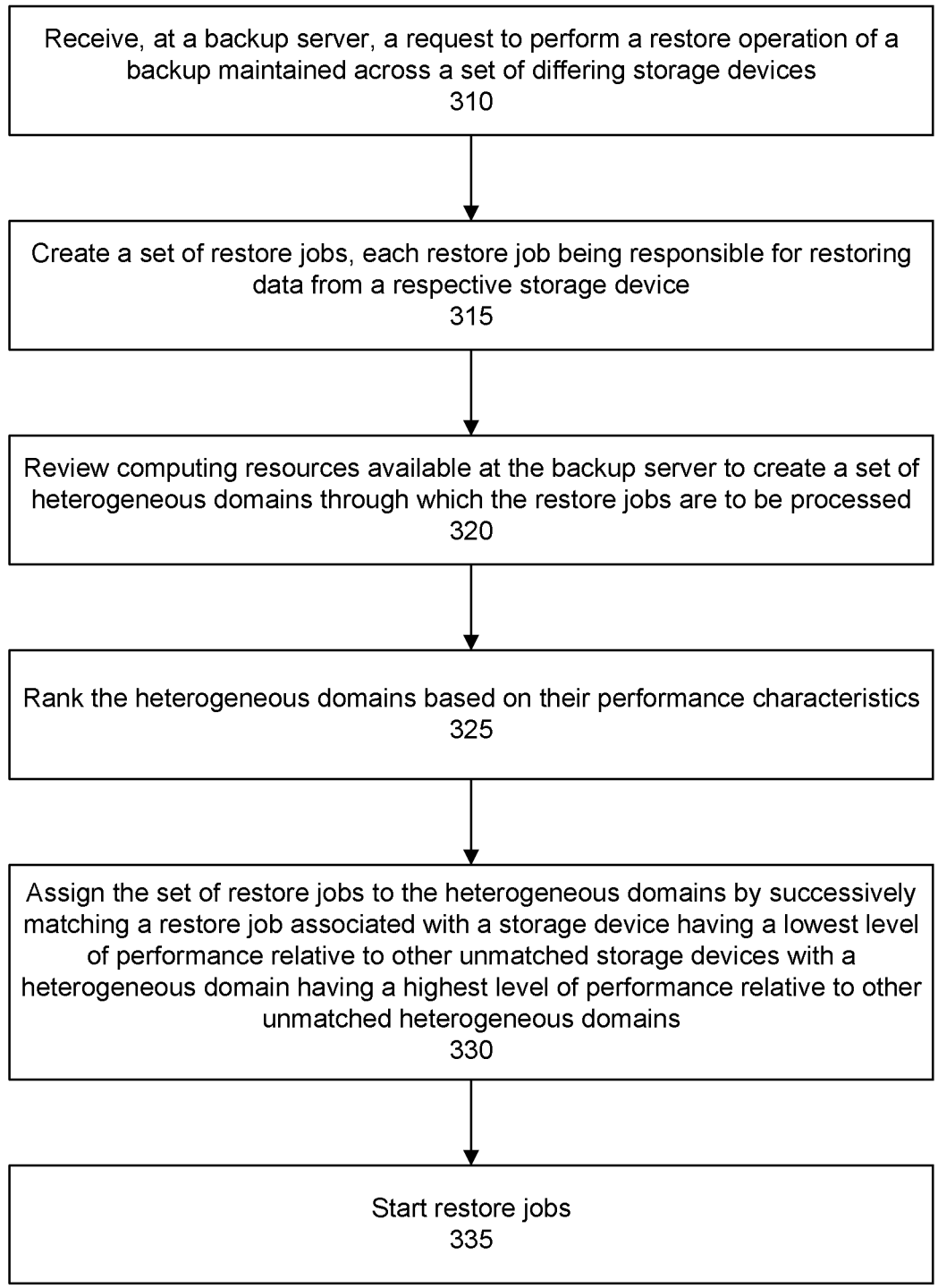
FIG. 3 shows an overall flow for reducing the time to complete a restore operation in accordance with one or more embodiments.

FIG. 3 shows an overall flow for conducting a restore operation according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 310, a request is received at a backup server to perform or conduct a restore operation of a backup maintained across a set of differing storage devices (e.g., storage devices having different levels of performance, technologies, configurations, specifications, media type, and so forth). In a step 315, a set of restore jobs are created. Each restore job is responsible for restoring data from a respective storage device. In a step 320, a review is conducted of computing resources available at the backup server to create a set of heterogeneous domains through which the restore jobs are to be processed. The computing resources may include processors and memory units. The review may include examining or analyzing information describing proximity, affinity, or locality between the processors and memory units.

In a step 325, the heterogeneous domains are ranked based on their performance characteristics. In a step 330, the restore jobs are assigned to the heterogeneous domains by successively matching a restore job associated with a storage device having a lowest level of performance relative to other unmatched storage devices with a heterogeneous domain having a highest level of performance relative to other unmatched heterogeneous domains. In a step 335, the restore jobs are started. In a specific embodiment, the performance of the heterogeneous domains may be monitored throughout or during the restore operation to detect any changes in performance. A change in performance may cause a re-ranking of the heterogeneous domains and re-assignment, reallocation, or switching of a restore job to a heterogeneous domain different from a heterogeneous domain that the restore job was initially assigned at a start of the restore operation.

More particularly, in a specific embodiment a compute unit includes CPU, memory and IO. In any system there are several CPU, memory and IO nodes. These resources can be combined in several way to process any execution. Two CPU sockets are connected through UPI (Ultra Path Interconnect). UPI is a point-to-point processor interconnect for multiprocessor systems with a shared address space. If data is accessed from another DIMM then performance will be slower. With the combination of these resource bandwidth will be different at a given time.

These heterogeneous domains are virtual domains based on real hardware. A domain can include CPU, memory and IO path. Cache attribute are used to measure the latency of the domain and bandwidth information is used to obtain capability to transfer data in the domain. These CPU, memory and IO path are grouped in such a way to allow for ranking heterogeneous domains according to performance.

Communicating over UPI slows down the processing time. In one socket (CPU) multiple DIMM(s) are attached and their performance will vary. In a specific embodiment, an algorithm continuously or regularly updates these heterogeneous domains based on their cache latency and bandwidth data. This allows for obtaining a ranked domain based on performance. All the domains are updated periodically to its best current value.

Figure 4:
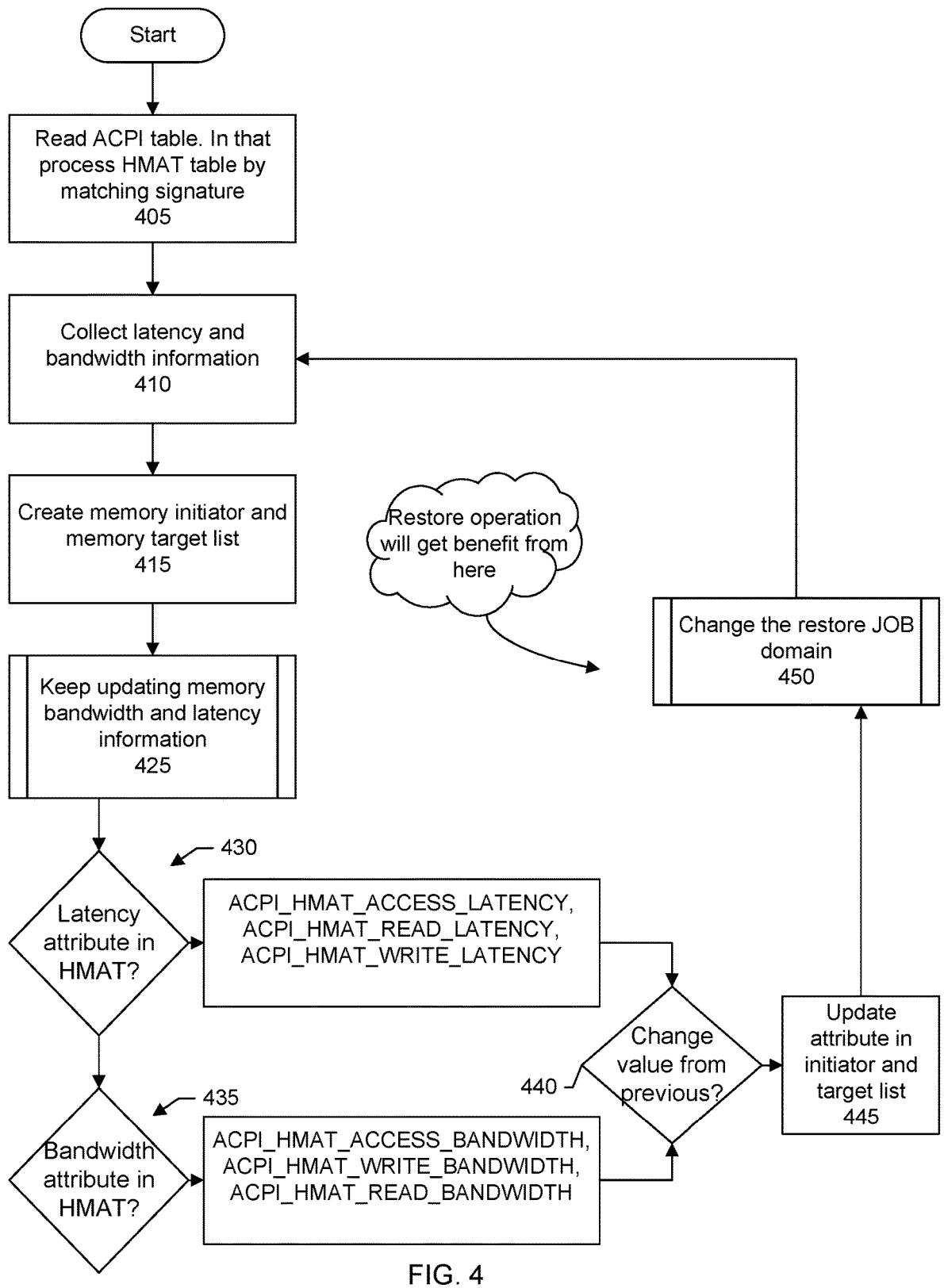
FIG. 4 shows further detail of a flow for reducing the time to complete a restore operation in accordance with one or more embodiments.

FIG. 4 shows further detail of a flow of using ACPI to boost a restore operation according to one or more embodiments. In a specific embodiment, there are three main phases. A first phase includes creating heterogeneous domains. A second phase includes ranking or updating the heterogeneous domains to a best value based on the latency and bandwidth information of the domains. A third phase includes assigning or scheduling the restore jobs to the heterogeneous domains.

Creating Heterogeneous Domain(s)

In a step 405, an ACPI table is read including processing an HMAT table by matching signatures associated with the tables. ACPI tables include a signature field that identifies a particular ACPI table. In a step 410, latency and bandwidth information is collected. In a step 415, a memory initiator and memory target list is created. The memory initiator includes a restore job associated with a backup storage device. The memory target includes a heterogeneous domain.

More particularly, when any restore operation starts, a restore JOB affinity to a desired domain is created. In a restore operation data is moved from a storage device to a CPU for processing and later it is moved to the customer environment. Here, an initiator is a storage location and the target is a heterogeneous domain. Initiator latency can not be improved because of the native infrastructure. Below is a flow for creating heterogeneous domains 1) Read SRAT ACPI table: The SRAT ACPI table is read from the operating system of the backup server. The reading includes parsing the memory affinity structure of the system.

2) Get CPU/memory inventory: This information may be inventoried from the remote access controller (e.g., iDRAC) inventory.

When the backup server operating system boots, parsing the SRAT ACPI table allows for obtaining all the information about hardware resources in the system. With all the available hardware having been identified, default domains can be created in the system.

To collect cache latency, the HMAT ACPI table is read to obtain cache data from the backup server operating system. Each heterogeneous domain is mapped with information including data access latency (ACCESS_LATENCY), data read latency (READ_LATENCY) and data write latency (WRITE_LATENCY). A combination of these latency values allows for calculating a favorable latency of the domain. In the restore operation, low access and read latencies are desirable in the domain.

To collect bandwidth information, the HMAT ACPI table in the backup server operating system is read and, in particular, the HMAT ACPI entry for different bandwidth information. Each domain is associated with information about access bandwidth (ACCESS_BANDWIDTH), read bandwidth (READ_BANDWIDTH) and write bandwidth (READ_BANDWIDTH). In the case of a restore operation, it is desirable for a domain to have high read and access bandwidths.

In other words, in a specific embodiment, an ACPI HMAT table is reviewed. The HMAT table includes information representing real-time performance of system. The lowest latency number represents best performance and the highest bandwidth number represents best performance. The latency and bandwidth numbers represented in a domain correspond to specification rated latency and bandwidth for the platform (virtual domains). The represented latency is determined by aggregating the specification rated latencies of the memory device and the interconnects from initiator to target (source of data to restore target). The represented bandwidth is determined by the lowest bandwidth among the specification rated bandwidth of the memory device and the interconnects from the initiator to target. Based on bandwidth, a chunk block or I/O range is dynamically adjusted to the domain.

Heterogeneous Domains Update to Best

In a step 425 (FIG. 4), a daemon runs to update memory bandwidth and latency information. In particular, the update process includes examining (step 430) latency attributes in the HMAT table (e.g., ACPI_HMAT_ACCESS_LATENCY, ACPI_HMAT_READ_LATENCY, and ACPI_HMAT_WRITE_LATENCY) and examining (step 435) bandwidth attributes in the HMAT table (e.g., ACPI_HMAT_ACCESS_BANDWIDTH, ACPI_HMAT_WRITE_BANDWIDTH, and ACPI_HMAT_READ_BANDWIDTH). In a step 440, a determination is made as to whether there have been any changes in the latency and bandwidth values. If so, the attributes in the initiator and target list is updated accordingly (step 445). In a step 450, a change may be made to the restore job domain so as to properly match and allocate restore jobs to the domains.

In a specific embodiment, once default latency and bandwidth information is ready for all the heterogeneous domain a daemon referred to as "heterogeneous domain update to best" periodically updates the latency and bandwidth information of the domains. In this specific embodiment, there is a local database or other competent data structure which stores the latency and bandwidth information for each of the heterogeneous domains. Based on a periodic set timer, the daemon reads the HMAT ACPI table and parses the latency and bandwidth information. This allows for maintaining up-to-date information on the domains including keeping all the domains to their best values in order to schedule any restore task to a best performing domain.

Scheduling a Restore JOB to Heterogeneous Domain

Based on heterogeneous domain latency and bandwidth information, different restore JOBs are associated to these domains. In particular, the _PXM control method may be invoked to obtain proximity indications of memory and CPU. _PXM is an ACPI control method. Upon invoking, _PXM evaluates to an integer that identifies a device (e.g., processor or memory) as belonging to a heterogeneous domain defined in the system resource affinity table (SRAT). ACPI _PXM (modified method) method is used to identify the components in the heterogeneous domain. This allows for determining the memory and CPU of the domain. Later restore JOBs can be associated with CPU and memory to a best performing heterogeneous domain. In other words, _PXM returns an integer value that identifies a device as belonging to a specific domain. Two devices in the same domain are considered to be in close proximity.

Figure 5:
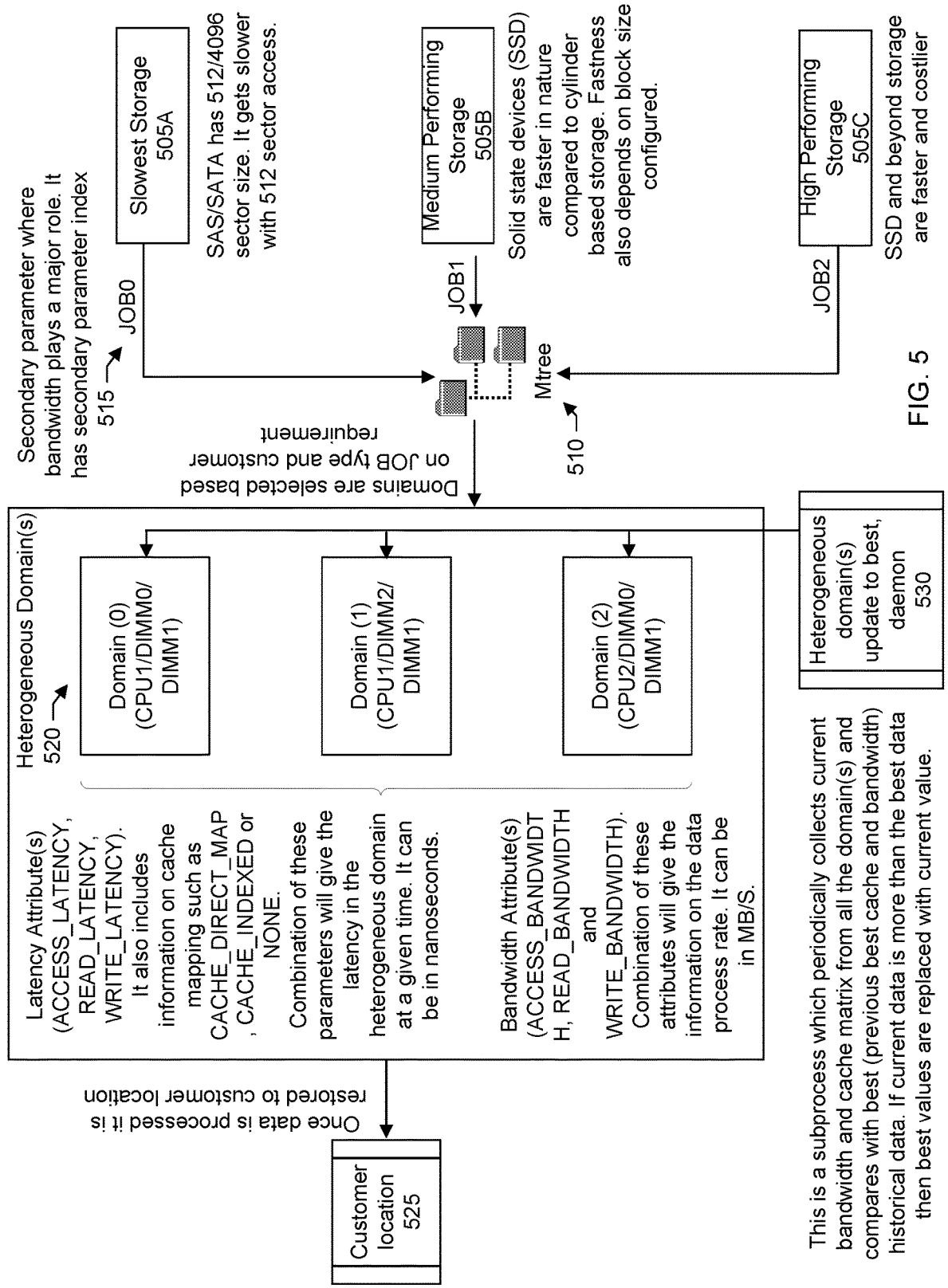
FIG. 5 shows a block diagram illustrating an example of reducing the time to complete a restore operation in accordance with one or more embodiments.

FIG. 5 shows a block diagram illustrating an example of performing or conducting a restore operation. In the example shown in FIG. 5, there a set of differing storage devices including first, second, and third storage devices 505A-505C, respectively. First storage device 505A is considered to be the slowest storage among the storage devices. For example, a storage technology of the first storage device may be serial attached SCSI (SAS) or serial advanced technology attachment (SATA). Second storage device 505B is considered to be the medium performing storage among the storage devices. For example, a storage technology of the second storage device may be based on solid state devices (SSDs) or flash storage. Third storage device 505C is considered to be the highest performing storage among the storage devices. For example, a storage technology of the third storage device may be based on very high performing SSDs.

Metadata 510 (e.g., Mtree data) that allows for reconstructing files in a backup is spread across multiple storage devices. As discussed, the performance of these devices may vary as per configuration and specification. When a restore operation starts, restore jobs (JOBs) 515 corresponding to the storage devices are generated to read data from a respective storage device. In the example shown in FIG. 5, there are three JOBs including JOB0, JOB1 and JOB2. JOB0 reads data from the slowest storage. JOB1 reads data from the medium performing storage device. JOB2 reads data from fastest storage device. In a specific embodiment, a restore engine of a backup application can read the Mtree data in a large block/sector size at once.

As per data access and read from storage devices, JOBs performance will be as below:

JOB2>JOB1>JOB0.

JOB2 will be fastest and JOB0 will be slowest. In other words, JOB2 is associated with the highest performing storage (storage 505C). JOB1 is associated with the medium performing storage (storage 505B). JOB0 is associated with the slowest storage (storage 505A).

Heterogeneous domains 520 are created corresponding to the JOBs. In the example shown in FIG. 5, there are three heterogeneous domains including domain (0), domain (1), and domain (2). Domain (0) includes CPU 1, DIMM 0, and DIMM 1. Domain (1) includes CPU 1, DIMM 2, and DIMM 1. Domain (2) includes CPU 2, DIMM 0, and DIMM 1. As discussed, domains may be created by reviewing the ACPI tables (e.g., SRAT table) to determine locality between system components (e.g., processor and memory) and form groups based on the locality. The review can determine or identify what memory belongs (e.g., is local) to which CPU.

The HMAT table may be reviewed to establish default or initial performance characteristics or metrics associated with the heterogeneous domains. In a specific embodiment, latency and bandwidth attributes are examined. The latency attributes include ACCESS_LATENCY, READ_LATENCY, and WRITE_LATENCY. Latency attributes may further include information on cache mapping such as CACHE DIRECT MAP, CACHE INDEXED, or NONE. These parameters can be combined or aggregated to obtain a latency value representing a heterogeneous domain at a given or particular time. The represented latency value may be expressed in nanoseconds.

The bandwidth attributes include ACCESS_BANDWIDTH, READ_BANDWIDTH, and WRITE_BANDWIDTH. These parameters can be combined or aggregated to obtain a bandwidth value (e.g., data process rate) representing a heterogeneous domain at a given or particular time. The represented bandwidth value may be expressed as megabytes (MB) per second (MB/s).

Upon collecting current latency and bandwidth information for the heterogeneous domains, the heterogeneous domains are ranked according to the latency and bandwidth information. In a specific embodiment, there can be a scoring algorithm that scores the heterogeneous domains based on their represented latency and bandwidth values. The scoring algorithm may assign different (or the same) weights to the latency and bandwidth parameters depending upon the degree to which latency and bandwidth affect restore times. One of latency and bandwidth may play a primary role and another of latency and bandwidth may play a secondary role in restore times. For example, if latency plays a greater role in restore times than bandwidth then the algorithm may assign a larger weight to latency than bandwidth.

As an example, consider a comparison between first and second heterogeneous domains to determine their ranking. The first heterogeneous domain currently has a first represented latency and a first represented bandwidth. The second heterogeneous domain currently has a second represented latency and a second represented bandwidth. A latency difference may be calculated between the first and second represented latencies. Similarly, a bandwidth difference may be calculated between the first and second represented bandwidths. A weighted value assigned to the latency difference may be greater than a weighted value assigned to the bandwidth difference. The greater weighted value assigned to the latency difference can help to amplify differences in latencies between heterogeneous domains to create a more favorable ranking of a particular heterogeneous domain based on its represented latency. The scoring algorithm may assign a better score to a heterogeneous domain having only a moderately better represented latency than a heterogeneous domain having a very good represented bandwidth.

It should be appreciated that the scoring algorithm described above is merely an example. For example, in other embodiments it may be that bandwidth plays a greater role in restore times than latency. Thus, differences in bandwidth may be weighted more than differences in latency. In other embodiments, it may be that bandwidth and latency are equally important in restore times. The scoring algorithm allows an administrator to finely tune the weighted values in order to properly reflect the degree to which latency and bandwidth affect restore times.

In the example shown in FIG. 5, consider that based on the latency and bandwidth information, the domains' performance is as below:

Domain(0)>Domain(1)>Domain(2)

In this example, domain (0) is the best performing heterogeneous domain at a particular moment. Thus, JOB0 which is slowest in read and access parameter is assigned to domain (0) (low latency and high bandwidth). Better processing will boost the restore performance.

More particularly, in this example, a first list of memory initiators is created as including first restore job (JOB0), second restore job (JOB1), and third restore job (JOB2). A second list of memory targets is created as including first heterogeneous domain (domain (0)), second heterogeneous domain (domain (1)), and third heterogeneous domain (domain (2)). JOB0 is associated with a first storage device having a first level of performance. JOB1 is associated with a second storage device having a second level of performance. JOB2 is associated with a third storage device having a third level of performance. The third level of performance of the third storage device is greater than the first and second levels of performance of the first and second storage devices, respectively. The second level of performance of the second storage device is greater than the first level of performance of the first storage device.

The heterogeneous domains are ranked according to their performance characteristics. The ranking may include scoring the heterogeneous domains based on their latency and bandwidth metrics. Consider that first heterogeneous domain (domain (0)) offers a first level of performance. Second heterogeneous domain (domain (1)) offers a second level of performance. Third heterogeneous domain (domain (2)) offers a third level of performance. The first level of performance of the first heterogeneous domain is greater than the second and third levels of performance of the second and third heterogeneous domains, respectively. The second level of performance of the second heterogeneous domain is greater than the third level of performance of the third heterogeneous domain.

The restore jobs may be assigned to the heterogeneous domains by successively matching a restore job associated with a storage device having a lowest level of performance relative to other unmatched storage devices with a heterogeneous domain having a highest level of performance relative to other unmatched heterogeneous domains. In this example, a first round of assignments includes assigning first restore job (JOB0), associated with the slowest storage device, to first heterogeneous domain (domain (0)), offering the highest level of performance.

After the first round of assignments, the remaining unmatched restore jobs/storage devices includes second restore job (JOB1) for the second storage device and third restore job (JOB2) for the third storage device. The remaining unmatched heterogeneous domains include second heterogeneous domain (domain (1)) and third heterogeneous domain (domain (2)). Thus, a second round of assignments includes assigning second restore job (JOB1) to second heterogeneous domain (domain (1)) because second restore job (JOB1) is associated with a storage device having a lowest level of performance relative to other remaining unmatched storage devices and the second heterogeneous domain (domain (1)) offers the highest level of performance relative to other remaining unmatched domains.

After the second round of assignments, the remaining unmatched restore jobs/storage devices includes third restore job (JOB2) for the third storage device. The remaining unmatched heterogeneous domain includes third heterogeneous domain (domain (2)). Thus, a third round of assignments includes assigning the third restore job (JOB2) to the third heterogeneous domain (domain (2)).

The data from the restore jobs are processed by the heterogeneous domains so that the data can be restored to a customer location 525.

Information about the performance characteristics of the heterogeneous domains including latency attributes (e.g., data access latency, data read latency, and data write latency), bandwidth attributes (e.g., access bandwidth, read bandwidth, and write bandwidth), ranking score, other performance metrics, or combinations of these are stored in a matrix or other competent data structure.

In a specific embodiment, a subprocess 530 runs periodically to collect current metrics or values for the latency and bandwidth attributes associated with the heterogeneous domains. The subprocess may be set to run at any time interval as desired (e.g., every 1, 2, 3, 4, or 5 minutes or any other frequency). The subprocess reexamines the performance of the heterogeneous domains by comparing the current values against the corresponding existing values stored in the matrix to determine whether any of the latency or bandwidth measurements have changed. The matrix may then be updated with any changes and the heterogeneous domains may be re-ranked. The re-ranking may include re-scoring the heterogeneous domains and re-assigning, reshuffling, rescheduling, reallocating, or switching the restore job assignments accordingly.

The subprocess may run during the restore operation so that the restore job assignments to the heterogeneous domains can be dynamically reshuffled or updated throughout the restore operation. This allows a restore job associated with a slowest performing backup storage device to be continuously assigned or reshuffled to a heterogeneous domain that currently offers the highest level of performance, while a restore job associated with a fastest performing backup storage device is continuously assigned or reshuffled to a heterogeneous domain that currently offers the lowest level of performance. Likewise, slower network traffic may be continuously assigned or reshuffled to the heterogeneous domain currently offering the highest level of performance while faster network traffic is continuously assigned or reshuffled to the heterogeneous domain currently offering the lowest level of performance.

For example, a restore operation may include first and second restore jobs. The first restore job is responsible for restoring data stored on a first storage device having a low level of performance. The second restore job is responsible for restoring data stored on a second storage device having a high level of performance. At a first time of initial restore job assignments, the first restore job may be assigned to a first heterogeneous domain and the second restore job may be assigned to a second heterogeneous domain, where the first heterogeneous domain offers better performance than the second heterogeneous domain at the first time. At a second time, after the first time, a reexamination of the heterogeneous domains may reveal that the second heterogeneous domain offers better performance than the first heterogeneous domain. Based on the reexamination, the first restore job may be reassigned from the first heterogeneous domain to the second heterogeneous domain. The second restore job may be reassigned from the second heterogeneous domain to the first heterogeneous domain. A balancing and rebalancing of restore jobs to heterogeneous domains may be performed throughout the restore operation.

In a specific embodiment, the various restore jobs of a restore operation are ranked based on current performance metrics associated with the corresponding storage devices. Ranking the restore jobs may include querying a storage device via an application programming interface (API) exposed by the storage device to collect current performance information, status, and other metrics about the storage device. The information may include, for example, input/output operations per second (TOPS), RAID level, latency, throughput, or combinations of these. There can be a weighted scoring algorithm that scores the various restore jobs corresponding to the storage devices based on factors including IOPS, RAID level, latency, throughput, other factors, or combinations of these. Factors that strongly impact restore times may be weighted more heavily than factors having smaller impacts on restore times.

In a specific embodiment, systems and techniques facilitate combinations of restore jobs and domains to achieve improvements in overall restore performance. In this specific embodiment, a better compute unit is provided to a slow restore JOB by allocating a favorable heterogeneous domain. Heterogeneous domains are ranked based on access and read cache attribute of memory. Heterogeneous domains are ranked based on access and read bandwidth.

Consider, as a business use case example, a data protection storage system in a production environment when Redundant Array of Independent Disks (RAID) group storage is deployed. A RAID group may include one or more disks, across which data is striped and stored. If job 0 is restoring data from a rebuilding RAID there will be an expected degraded IO performance. At the same time, job 1 is restoring data from a normal RAID. From an IO read performance view, job 0 is slower than job 1. In this example, the better performing domain is provided to job 0 to improve the performance.

As another example, consider a data protection storage system having an SSD cache which may be a metadata or data cache found in deduplication-based products. If job 0 is restoring data from an SSD which is running drive firmware (FW) internal GC (garbage collection) there will be an expected degraded performance. At the same time, job 1 is restoring data from a normal SSD. From an IO read performance view, job 0 is slower than job 1, so allocating a better domain to job 0 will improve the overall performance. Further, different restore JOBs can be switched between different domains to improve overall restore performance.

In a specific embodiment, there is a method including: creating a plurality of restore jobs to restore a backup, the backup being maintained across a plurality of storage devices coupled to a backup server, the plurality of storage devices having different levels of performance, and each restore job being responsible for restoring from a respective storage device; reviewing information describing arrangements of processors and memory units available at the backup server to create a plurality of heterogeneous domains, each heterogeneous domain comprising a processor and memory unit; examining performance characteristics of the plurality of heterogeneous domains, the performance characteristics comprising latency and bandwidth measurements associated with each heterogeneous domain; ranking the plurality of heterogeneous domains based on the performance characteristics; and assigning the plurality of restore jobs to the plurality of heterogeneous domains by successively matching a restore job associated with a storage device having a lowest level of performance relative to other unmatched storage devices with a heterogeneous domain having a highest level of performance relative to other unmatched heterogeneous domains.

A storage technology of a storage device may be different from a storage technology of another storage device. In an embodiment, the method further includes: assigning slower incoming network traffic to a heterogeneous domain having a high level of performance; and assigning faster incoming network traffic to a heterogeneous domain having a low level of performance.

The method may further include: periodically reexamining the performance characteristics of the plurality of heterogeneous domains; and based on the reexamination, switching a particular restore job assigned to a first heterogeneous domain to a second heterogeneous domain, different from the first heterogeneous domain.

Reviewing information describing arrangements of processors and memory units available at the backup server may include: parsing a memory affinity structure of the backup server by reading a Static Resource Affinity Table (SRAT) as provided according to an Advanced Configuration and Power Interface (ACPI) specification.

Examining performance characteristics of the plurality of heterogeneous domains may include: reading a Heterogeneous Memory Attribute Table (HMAT) as provided according to an Advanced Configuration and Power Interface (ACPI) specification to obtain values for a plurality of latency parameters and values for a plurality of bandwidth parameters for each heterogeneous domain, the values for the plurality of latency parameters comprising a data access value, a data read value, and a data write value, the values for the plurality of bandwidth parameters comprising an access bandwidth value, a read bandwidth value, and a write bandwidth value; aggregating, for each heterogeneous domain, the values for the plurality of latency parameters to obtain a combined latency value that is to represent latency for a respective heterogeneous domain; and aggregating, for each heterogeneous domain, the values for the plurality of bandwidth parameters to obtain a combined bandwidth value that is to represent bandwidth for the respective heterogeneous domain.

In another specific embodiment, there is a system comprising: a processor; and memory configured to store one or more sequences of instructions which, when executed by the processor, cause the processor to carry out the steps of: creating a plurality of restore jobs to restore a backup, the backup being maintained across a plurality of storage devices coupled to a backup server, the plurality of storage devices having different levels of performance, and each restore job being responsible for restoring from a respective storage device; reviewing information describing arrangements of processors and memory units available at the backup server to create a plurality of heterogeneous domains, each heterogeneous domain comprising a processor and memory unit; examining performance characteristics of the plurality of heterogeneous domains, the performance characteristics comprising latency and bandwidth measurements associated with each heterogeneous domain; ranking the plurality of heterogeneous domains based on the performance characteristics; and assigning the plurality of restore jobs to the plurality of heterogeneous domains by successively matching a restore job associated with a storage device having a lowest level of performance relative to other unmatched storage devices with a heterogeneous domain having a highest level of performance relative to other unmatched heterogeneous domains.

In another specific embodiment, there is a computer program product, comprising a non-transitory computer-readable medium having a computer-readable program code embodied therein, the computer-readable program code adapted to be executed by one or more processors to implement a method comprising: creating a plurality of restore jobs to restore a backup, the backup being maintained across a plurality of storage devices coupled to a backup server, the plurality of storage devices having different levels of performance, and each restore job being responsible for restoring from a respective storage device; reviewing information describing arrangements of processors and memory units available at the backup server to create a plurality of heterogeneous domains, each heterogeneous domain comprising a processor and memory unit; examining performance characteristics of the plurality of heterogeneous domains, the performance characteristics comprising latency and bandwidth measurements associated with each heterogeneous domain; ranking the plurality of heterogeneous domains based on the performance characteristics; and assigning the plurality of restore jobs to the plurality of heterogeneous domains by successively matching a restore job associated with a storage device having a lowest level of performance relative to other unmatched storage devices with a heterogeneous domain having a highest level of performance relative to other unmatched heterogeneous domains.

Figure 6:
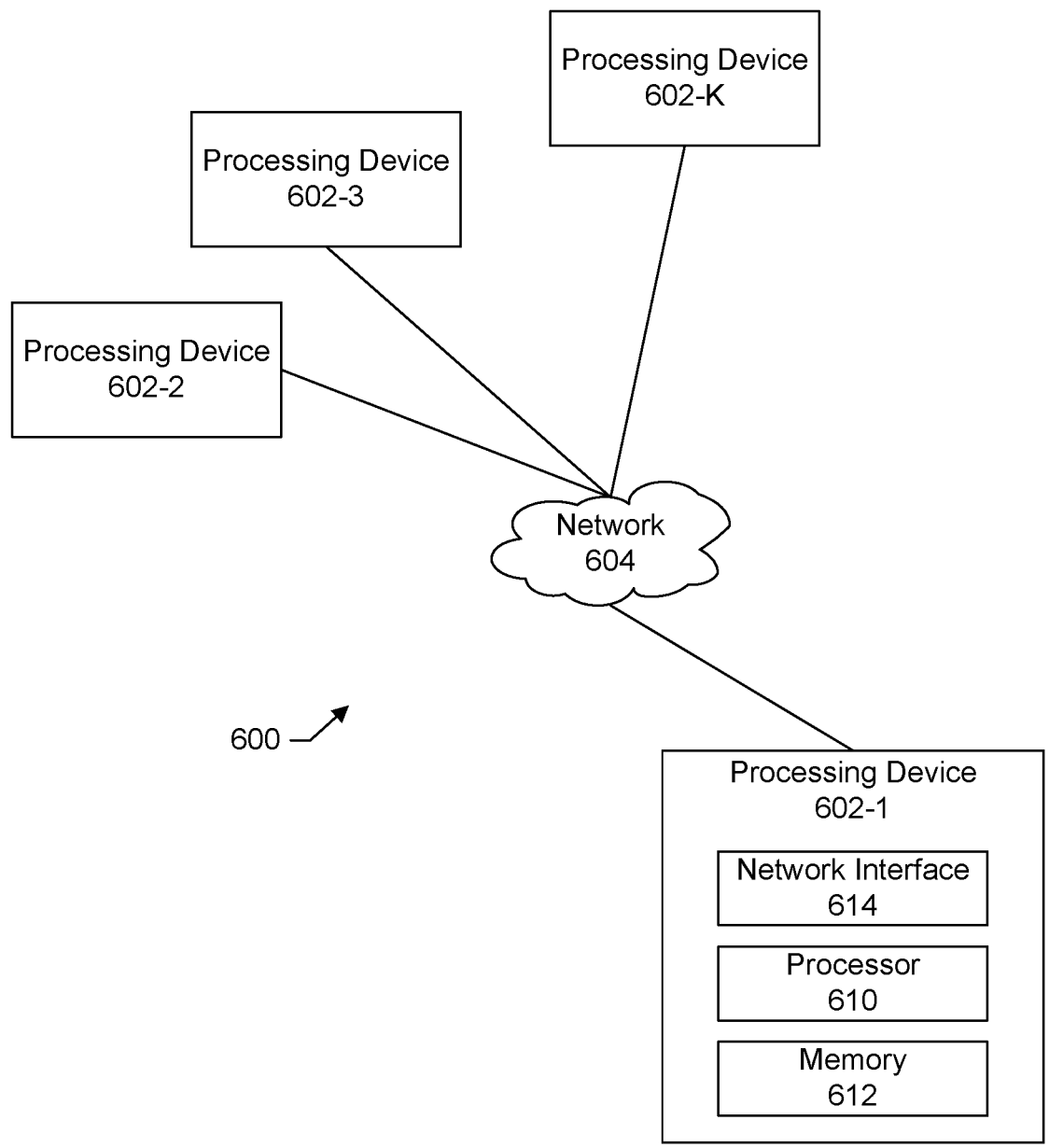
FIG. 6 shows a block diagram of a processing platform that may be utilized to implement at least a portion of an information processing system, according to one or more embodiments.

FIG. 6 shows an example of a processing platform 600. The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 600 are illustratively implemented in the form of software running on one or more processing devices.

Figure 7:
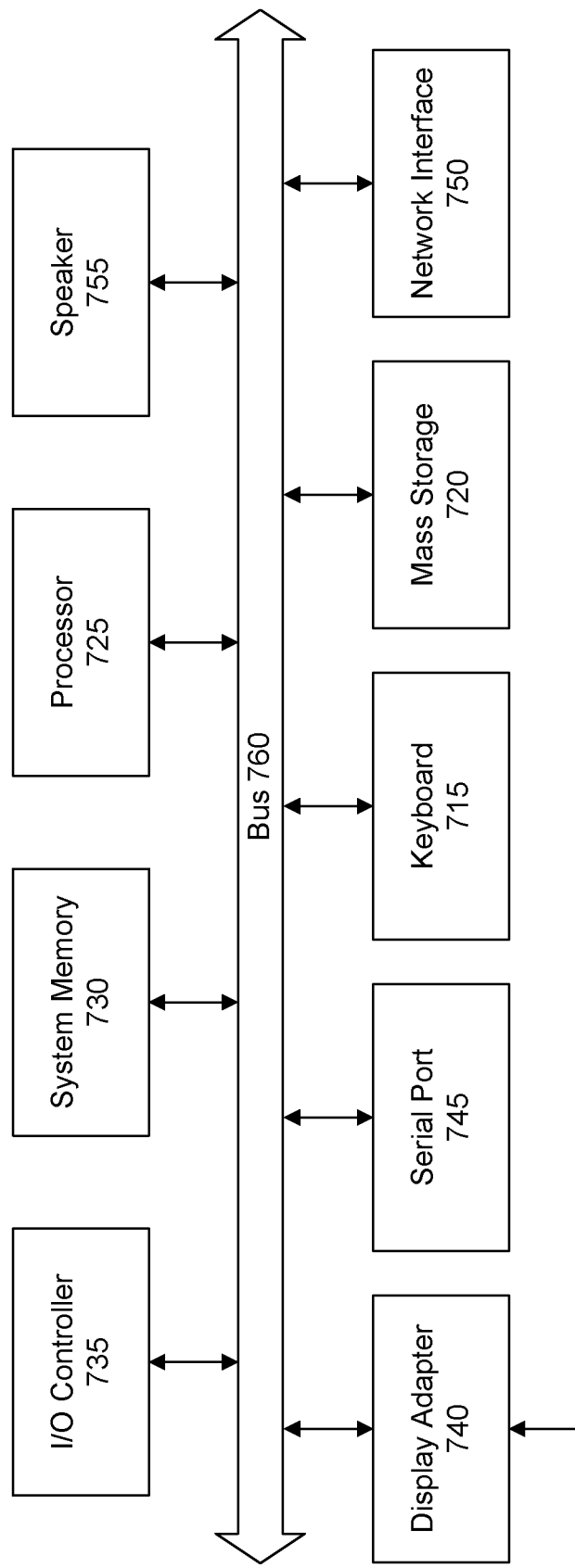
FIG. 7 shows a block diagram of a computer system suitable for use with the information processing system, according to one or more embodiments.

FIG. 7 shows a system block diagram of a computer system 705 used to execute the software of the present system described herein. The computer system includes a monitor 707, keyboard 715, and mass storage devices 720. Computer system 705 further includes subsystems such as central processor 725, system memory 730, input/output (I/O) controller 735, display adapter 740, serial or universal serial bus (USB) port 745, network interface 750, and speaker 755. The system may also be used with computer systems with additional or fewer subsystems. For example, a computer system could include more than one processor 725 (i.e., a multiprocessor system) or a system may include a cache memory.

Arrows such as 760 represent the system bus architecture of computer system 705. However, these arrows are illustrative of any interconnection scheme serving to link the subsystems. For example, speaker 755 could be connected to the other subsystems through a port or have an internal direct connection to central processor 725. The processor may include multiple processors or a multicore processor, which may permit parallel processing of information. Computer system 705 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
creating a plurality of restore jobs to restore a backup, the backup being maintained across a plurality of storage devices coupled to a backup server, the plurality of storage devices having different levels of performance, and each restore job being responsible for restoring from a respective storage device;
reviewing information describing arrangements of processors and memory units available at the backup server to create a plurality of heterogeneous domains, each heterogeneous domain comprising a processor and memory unit;
examining performance characteristics of the plurality of heterogeneous domains, the performance characteristics comprising latency and bandwidth measurements associated with each heterogeneous domain;
ranking the plurality of heterogeneous domains based on the performance characteristics; and
assigning the plurality of restore jobs to the plurality of heterogeneous domains by successively matching a restore job associated with a storage device having a lowest level of performance relative to other unmatched storage devices with a heterogeneous domain having a highest level of performance relative to other unmatched heterogeneous domains, wherein the examining performance characteristics of the plurality of heterogeneous domains comprises:
reading a Heterogeneous Memory Attribute Table (HMAT) as provided according to an Advanced Configuration and Power Interface (ACPI) specification to obtain values for a plurality of latency parameters and values for a plurality of bandwidth parameters for each heterogeneous domain,
the values for the plurality of latency parameters comprising a data access value, a data read value, and a data write value,
the values for the plurality of bandwidth parameters comprising an access bandwidth value, a read bandwidth value, and a write bandwidth value;
aggregating, for each heterogeneous domain, the values for the plurality of latency parameters to obtain a combined latency value that is to represent latency for a respective heterogeneous domain; and
aggregating, for each heterogeneous domain, the values for the plurality of bandwidth parameters to obtain a combined bandwidth value that is to represent bandwidth for the respective heterogeneous domain.

2. The method of claim 1 wherein a storage technology of a storage device is different from a storage technology of another storage device.

3. The method of claim 1 further comprising:
periodically reexamining the performance characteristics of the plurality of heterogeneous domains; and
based on the reexamination, switching a particular restore job assigned to a first heterogeneous domain to a second heterogeneous domain, different from the first heterogeneous domain.

4. The method of claim 1 wherein the reviewing information describing arrangements of processors and memory units available at the backup server comprises:
parsing a memory affinity structure of the backup server by reading a Static Resource Affinity Table (SRAT) as provided according to the ACPI specification.

5. A system comprising: a processor; and memory configured to store one or more sequences of instructions which, when executed by the processor, cause the processor to carry out the steps of:
creating a plurality of restore jobs to restore a backup, the backup being maintained across a plurality of storage devices coupled to a backup server, the plurality of storage devices having different levels of performance, and each restore job being responsible for restoring from a respective storage device;

reviewing information describing arrangements of processors and memory units available at the backup server to create a plurality of heterogeneous domains, each heterogeneous domain comprising a processor and memory unit;

examining performance characteristics of the plurality of heterogeneous domains, the performance characteristics comprising latency and bandwidth measurements associated with each heterogeneous domain;

ranking the plurality of heterogeneous domains based on the performance characteristics; and assigning the plurality of restore jobs to the plurality of heterogeneous domains by successively matching a restore job associated with a storage device having a lowest level of performance relative to other unmatched storage devices with a heterogeneous domain having a highest level of performance relative to other unmatched heterogeneous domains, wherein the examining performance characteristics of the plurality of heterogeneous domains comprises:

reading a Heterogeneous Memory Attribute Table (HMAT) as provided according to an Advanced Configuration and Power Interface (ACPI) specification to obtain values for a plurality of latency parameters and values for a plurality of bandwidth parameters for each heterogeneous domain, the values for the plurality of latency parameters comprising a data access value, a data read value, and a data write value, the values for the plurality of bandwidth parameters comprising an access bandwidth value, a read bandwidth value, and a write bandwidth value;

aggregating, for each heterogeneous domain, the values for the plurality of latency parameters to obtain a combined latency value that is to represent latency for a respective heterogeneous domain; and aggregating, for each heterogeneous domain, the values for the plurality of bandwidth parameters to obtain a combined bandwidth value that is to represent bandwidth for the respective heterogeneous domain.

6. The system of claim 5 wherein a storage technology of a storage device is different from a storage technology of another storage device.

7. The system of claim 5 wherein the processor further carries out the steps of:

periodically reexamining the performance characteristics of the plurality of heterogeneous domains; and based on the reexamination, switching a particular restore job assigned to a first heterogeneous domain to a second heterogeneous domain, different from the first heterogeneous domain.

8. The system of claim 5 wherein the reviewing information describing arrangements of processors and memory units available at the backup server comprises:

parsing a memory affinity structure of the backup server by reading a Static Resource Affinity Table (SRAT) as provided according to the ACPI specification.

9. A computer program product, comprising a non-transitory computer-readable medium having a computer-readable program code embodied therein, the computer-readable program code adapted to be executed by one or more processors to implement a method comprising:

creating a plurality of restore jobs to restore a backup, the backup being maintained across a plurality of storage devices coupled to a backup server, the plurality of storage devices having different levels of performance, and each restore job being responsible for restoring from a respective storage device;

reviewing information describing arrangements of processors and memory units available at the backup server to create a plurality of heterogeneous domains, each heterogeneous domain comprising a processor and memory unit;

examining performance characteristics of the plurality of heterogeneous domains, the performance characteristics comprising latency and bandwidth measurements associated with each heterogeneous domain;

ranking the plurality of heterogeneous domains based on the performance characteristics; and assigning the plurality of restore jobs to the plurality of heterogeneous domains by successively matching a restore job associated with a storage device having a lowest level of performance relative to other unmatched storage devices with a heterogeneous domain having a highest level of performance relative to other unmatched heterogeneous domains, wherein the examining performance characteristics of the plurality of heterogeneous domains comprises:

reading a Heterogeneous Memory Attribute Table (HMAT) as provided according to an Advanced Configuration and Power Interface (ACPI) specification to obtain values for a plurality of latency parameters and values for a plurality of bandwidth parameters for each heterogeneous domain, the values for the plurality of latency parameters comprising a data access value, a data read value, and a data write value, the values for the plurality of bandwidth parameters comprising an access bandwidth value, a read bandwidth value, and a write bandwidth value;

aggregating, for each heterogeneous domain, the values for the plurality of latency parameters to obtain a combined latency value that is to represent latency for a respective heterogeneous domain; and aggregating, for each heterogeneous domain, the values for the plurality of bandwidth parameters to obtain a combined bandwidth value that is to represent bandwidth for the respective heterogeneous domain.

10. The computer program product of claim 9 wherein a storage technology of a storage device is different from a storage technology of another storage device.

11. The computer program product of claim 9 wherein the method further comprises:

periodically reexamining the performance characteristics of the plurality of heterogeneous domains; and based on the reexamination, switching a particular restore job assigned to a first heterogeneous domain to a second heterogeneous domain, different from the first heterogeneous domain.

12. The computer program product of claim 9 wherein the reviewing information describing arrangements of processors and memory units available at the backup server comprises:

parsing a memory affinity structure of the backup server by reading a Static Resource Affinity Table (SRAT) as provided according to the ACPI specification.

\* \* \* \* \*